Feb. 23, 1926. 1,574,395
E. A. HOWE
VEHICLE JACK
Filed July 28, 1925
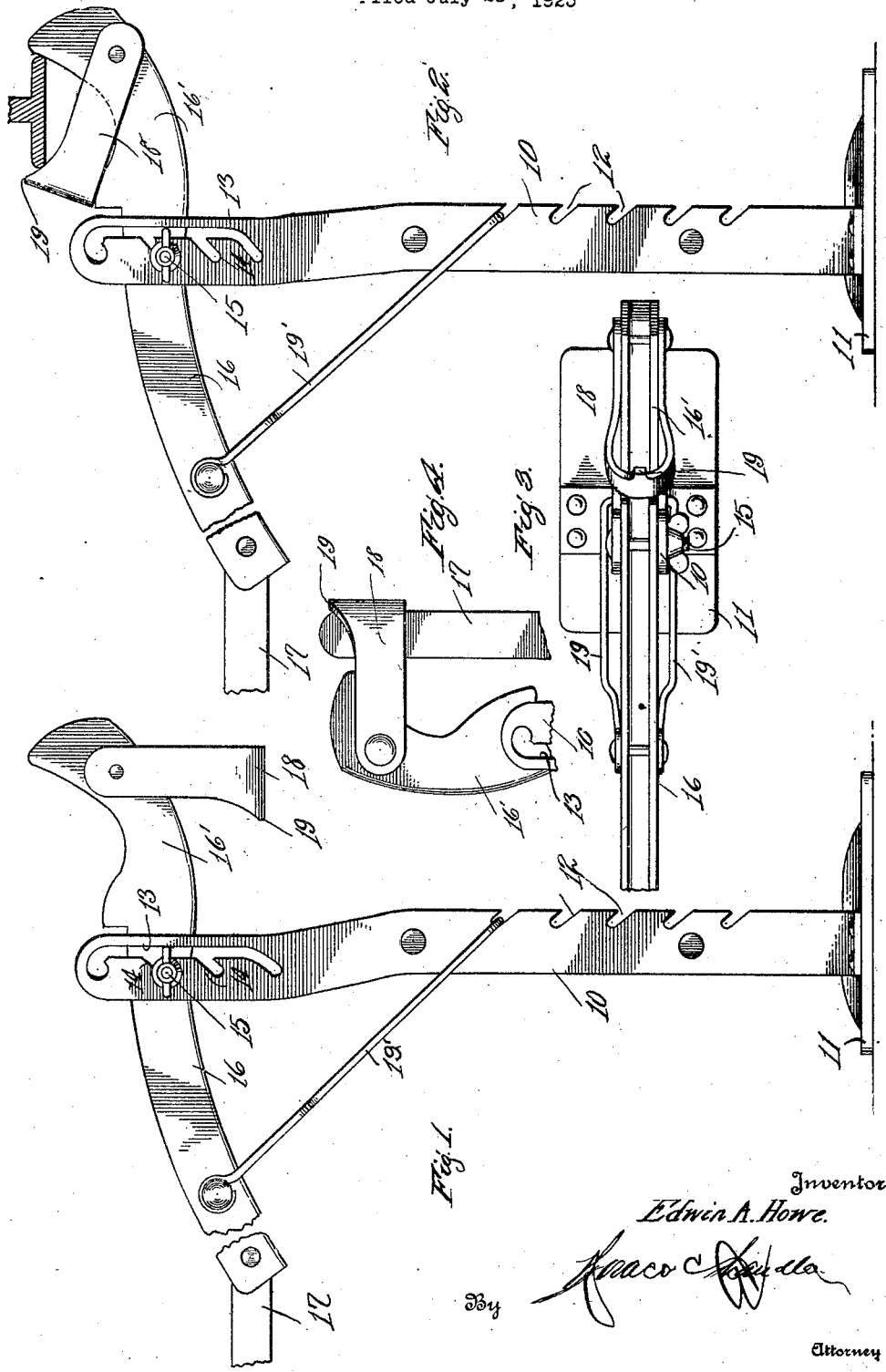
Inventor
Edwin A. Howe.
By
Attorney Patented Feb. 23, 1926.

1,574,395

UNITED STATES PATENT OFFICE.

EDWIN A. HOWE, OF BANCROFT, IOWA.

VEHICLE JACK.

Application filed July 28, 1925. Serial No. 46,615.

*To all whom it may concern:*

Be it known that I, EDWIN A. HOWE, a citizen of the United States, residing at Bancroft, in the county of Kossuth, State of Iowa, have invented certain new and useful Improvements in Vehicle Jacks; and I do hereby declare the following to be a full, clear, and exact description of the invention, such as will enable others skilled in the art to which it appertains to make and use the same.

This invention relates to new and useful improvements in jacks, and particularly to vehicle lifting jacks.

The present invention is an improvement over my prior Patent 1,492,461, issued April 29, 1924, and particularly to the axle engaging portion of the lifting lever, by means of which the jack may be quickly adjusted for axles of different heights.

In my prior patent the axle engaging end of the lifting lever contained a shoulder against which the axle was adapted to rest so that danger of the axle sliding on the lever, when the lever was rocked, was eliminated. In the present application this portion of the lifting lever is provided with a movable part adapted to be swung into and out of position for supporting the axle, whereby axles of different heights from the ground may be readily accommodated. Furthermore, the movable member is provided with a shoulder adapted to maintain the axle against sliding movement when the lever is rocked.

Other objects and advantages will be apparent from the following description when taken in connection with the accompanying drawing.

In the drawing:

Figure 1 is a side elevation of a jack made in accordance with the present invention.

Figure 2 is a fragmentary elevation of the axle engaging end of the lifting lever, showing the movable member in position for supporting an axle.

Figure 3 is a top plan view of the parts in the position of Figure 2.

Figure 4 is a fragmentary elevation showing the use of the yoke 18 for holding the handle section.

Referring particularly to the accompanying drawing, 10 represents a standard mounted on the base 11, and having the longitudinal series of ratchet notches 12 in one vertical edge face.

In the upper end of the standard there is formed a longitudinal slot 13 from one side of which extends the series of downwardly inclined notches or recesses 14 for the reception of the transverse pivot bolt 15, on which is mounted the lifting lever 16. The lever 16 is preferably formed of U-shaped cross section, and pivotally mounted in the end remote from the standard is a section 17 which is adapted to be extended for increasing the leverage of the lever, or folded into the channel of the lever, when not in use. The axle engaging end of the lever 16 extends a suitable distance beyond the other side of the standard, and is formed with a downwardly bowed portion 16', in which the axle is adapted to rest, the rear end of said recess providing a shoulder to prevent the axle sliding rearwardly. Straddling the axle engaging end of the lever 16, and pivotally connected thereto, is a U-shaped member 18, which, when not in use depends from said end of the lever, and when in use is swung into position over the recess or bowed portion 16'. The free end of the upper portion of the member 18, when said member is disposed above the axle engaging end of the lever, is formed with a projection or lip 19 for preventing the rearward sliding of the axle, when the axle is resting on said member. This member 18, when swung into the position shown in Figure 2, rises approximately an inch and one-half, whereby an axle may be properly engaged and the vehicle lifted, whether the axle be high or low.

Furthermore, by means of the pivot bolt 15, and the slot and recesses 13 and 14, the lifting lever may be elevated, should the member 18 not be of sufficient height.

Pivotally mounted on the lifting lever, and straddling the standard in position to engage its bight portion with the ratchet notches 12, is a bracing yoke 19'.

The member 18 is adapted to be swung over to embrace the outer end of the section 17, when said section is folded into the main portion 16 of the lever, whereby to retain the parts in proper folded condition.

What is claimed is:

1. A jack including a standard, a foldable lifting lever pivotally mounted on the standard and having a recessed axle supporting end, and a member movably mounted on the axle supporting end of the lever and movable into and out of cooperative axle supporting position over said recessed end, at times, and for retaining embracing engagement with the foldable lever.

2. A jack including a standard, a lifting lever pivotally supported on the standard and having a recessed axle supporting end and a foldable handle section, and a member pivotally supported on the axle supporting end of the lever and movable into and out of position over said recessed end to support an axle, said member having an axle engaging lip cooperating with an end of said recess, at times, for maintaining an axle against slipping from said member and for embracing said foldable handle section at times.

3. A jack including a standard and a lifting lever pivotally carried thereby, said lever comprising a pair of pivotally connected and foldable sections, and a yoke member movably carried by the axle engaging end of the lever and arranged to embrace the folded lever sections and standard, at times and to support an axle at times.

In testimony whereof, I affix my signature.

EDWIN A. HOWE.